United States Patent

Enning

[11] Patent Number: 5,971,460
[45] Date of Patent: Oct. 26, 1999

[54] STRESS-BEARING STRUCTURE OF A MOTOR-VEHICLE BODY MADE WITH HOLLOW-SECTION BEAMS

[75] Inventor: Norbert Enning, Denkendorf, Germany

[73] Assignee: Audi AG, Germany

[21] Appl. No.: 09/023,877

[22] Filed: Feb. 13, 1998

[30] Foreign Application Priority Data

Feb. 28, 1997 [DE] Germany .......................... 197 08 214

[51] Int. Cl.⁶ ................................................. B62D 27/20
[52] U.S. Cl. ........................ 296/30; 296/203.03; 296/210
[58] Field of Search ............................... 296/29, 30, 188, 296/193, 205, 203.03, 210

[56] References Cited

U.S. PATENT DOCUMENTS

| | | | |
|---|---|---|---|
| 4,462,629 | 7/1984 | Todori et al. .............................. | 296/30 |
| 4,618,163 | 10/1986 | Hasler et al. . | |
| 5,116,161 | 5/1992 | Faisst ..................................... | 296/30 X |
| 5,567,005 | 10/1996 | Kosuge et al. ......................... | 296/30 X |
| 5,873,618 | 2/1999 | Ejima ....................................... | 296/30 |

FOREIGN PATENT DOCUMENTS

| | | |
|---|---|---|
| 0 146 716 B1 | 10/1984 | European Pat. Off. . |
| 21 28 281 B2 | 12/1971 | Germany . |
| 27 51 753 C2 | 5/1979 | Germany . |

Primary Examiner—Joseph D. Pape
Attorney, Agent, or Firm—Feix & Feix

[57] ABSTRACT

The invention concerns a stress-bearing structure of a motor-vehicle body made with hollow section beams, having at least at one structural member junction point (1) at which a first hollow section beam (2) is joined with a second hollow section beam (3) and a third hollow section beam (4), which are opposite each other on either side of the first hollow section beam. The second and third hollow section beams (3, 4) are attached to the respective opposite sides of the first hollow section beam (2) by a butt joint. The junction point (1) is reinforced by a junction point reinforcement element in the form of a hollow section extrusion (6). In accordance with the invention, a hollow section extrusion (6) is positioned beneath the structural-member junction point (1) on the inside of the vehicle body and fixed in place. The longitudinal axis of the hollow section extrusion (6) runs in the same direction as the longitudinal axis of the first hollow section beam (2). The transverse profile of the extrusion section has a greater width than the width of the first hollow-section beam (2), so that the extrusion section lies against both the second hollow-section beam (3) and the third hollow-section beam (4) with its contact surfaces (11, 13) attached to them. Lateral stresses exerted on the structural-member junction point (1) are absorbed and stayed by the hollow section extrusion (6) which functions as a tie rod. In a preferred embodiment of the invention, the hollow section beams (2, 3, 4) and the section of extrusion (6) are made of a light metal.

24 Claims, 1 Drawing Sheet

STRESS-BEARING STRUCTURE OF A MOTOR-VEHICLE BODY MADE WITH HOLLOW-SECTION BEAMS

TECHNICAL FIELD

The present invention relates to improvements in stress bearing lattice frame structure for passenger vehicle bodies made with hollow section beams. More particularly, the presents invention relates to a technique and assembly for providing reinforcement at a high stress junction point between three intersecting hollow section beams of a motor vehicle body, and whereby the reinforced junction point is free of strain and is made stronger in comparison with simple welded butt joint connections.

BACKGROUND OF THE INVENTION

A familiar stress bearing support structure for passenger vehicles in the form of a lattice-frame made with hollow section beams is disclosed in European patent EP 0 146 716. The hollow section beams, formed as extruded aluminum sections, are held together by aluminum joint elements made by casting or forging. Such a "transfer joint technique" utilizing the cast aluminum joint elements provides a sturdy stress bearing structure with strong connections between the aluminum extrusions. However, the above-described transfer joint technique is also, on the whole, cost-intensive.

Butt welding is a simple and inexpensive technique for joining aluminum extrusions together at right angles. It is well known that thermal welding of heat treatable aluminum alloys produces a significant decrease in the strength of material in the so-called "zone of thermal influence" immediately adjacent the weld zone. For this reason, a welded butt-joint connection has a much lower stress carrying capability than a transfer joint made with cast aluminum joint elements. Thus, simple welded butt-joint connections are not suitable for many high stress joint regions of a passenger vehicle framework assembled from extruded aluminum frame elements. In particular, it is desirable to avoid use of transverse weld connections on stress bearing hollow section longitudinal members made of extruded light metal.

In addition, other connection techniques and arrangements for joining light alloy, hollow section frame members of superstructure frameworks for street and rail vehicles are known from DE 21 28 281 B2 and DE 27 51 753 C2. Here, a number of vertically and horizontally oriented hollow section bars are arranged at right angles to each other to form the framework of a wall. Triangular corner brackets are placed in the angles at the joints and are welded in place to provide reinforcement. In this arrangement, the framework is stabilized, especially against shearing movements of the hollow-section bars in the wall plane. On the other hand, lateral stresses on the junction points of the bars are absorbed and stayed only to a small degree by such corner brackets. Such connections are therefore not well suited for junction points of structural members in passenger vehicles which must absorb and stay high levels of lateral stress, such as occurs in a collision event.

One junction point in a motor vehicle body that must be able to withstand a high level of lateral stress is the upper rear corner joint region of the vehicle roof formed by the three way junction of the longitudinal roof girder, the B column, and the transverse roof girder. This particular junction point must be constructed so that it is capable of sustaining great stress in order to prevent the vehicle roof from collapsing during a roll over.

SUMMARY OF THE INVENTION

It is among the objects of the present invention to improve the stress absorbing and stress staying capability of the critically important junction points in a stress bearing lattice frame motor vehicle body assembled from hollow section beams.

It is another object of the invention to provide an improved joint assembly for reinforcement of the critical junction point located at the upper rear roof corner region of a motor vehicle body, and in particular, the junction point defined by the respective butt end attachments of a generally vertically oriented B column and a transverse roof girder to opposite sides of a longitudinal roof girder.

It is still another object of the invention to provide a reinforced joint assembly for a motor vehicle body of the type described which is low cost and simple in manufacture.

In accordance with a preferred embodiment of the present invention, a high stress junction point of a motor vehicle body is reinforced by a hollow section extrusion that is secured in place beneath the junction point within the vehicle's body. The junction point is formed by the butt end attachments of a second and a third hollow section beam to the respective opposing sides of a first longitudinally oriented hollow section beam. The hollow section extrusion is joined to this junction point in such a manner that the longitudinal axis of the hollow section extrusion is aligned in the same direction as the longitudinal axis the first hollow section beam. The transverse profile of the hollow section extrusion has a width greater than the width of the first hollow section beam. The transverse profile of the hollow section extrusion further includes contact surfaces that extend beyond the respective opposite sides of the first hollow section beam and lay against and join to the respective second and third hollow section beams.

By means of the foregoing, a lateral stress exerted on the junction point coming from the outside of the vehicle body will be absorbed and stayed by the extrusion section which functions as a tie rod. The result is a reinforced junction point that is very strong with regard to such lateral stresses. Such a reinforced joint can be made at points of critical importance with respect to collisions.

In accordance with an especially advantageous feature of the invention, the transverse profile of the hollow section extrusion is made flat with several cross section chambers. This configuration for the hollow section extrusion produces a tie rod capable of sustaining a great amount of stress. In a specific embodiment of the invention, the hollow section extrusion is formed with four cross section chambers arranged adjacent to each other. Single wall flanges are formed at both ends of the chamber region.

In accordance with another advantageous feature of the invention, the length of the hollow section extrusion (i.e., the dimension of the hollow section extrusion that runs in the longitudinal direction of the first hollow section beam) is made shorter than the width of both the second and the third hollow section beams. When this is the case, the second and third hollow-section beams project to the side beyond the edge of the attached hollow section extrusion. These edge areas are especially well suited for strong aluminum longitudinal welds, thus making it possible to avoid critical transverse welds.

The present invention is especially well suited for strengthening critical high stress junction points on stress bearing structures constructed entirely of light metal hollow section extruded beams. The joining of the hollow section extrusion with the hollow section beams is preferably effected by means of weld joints or bonding joints in the customary Fashion.

An especially advantageous application is to employ a junction point made in accordance with the invention at the junction point of a longitudinal roof girder, a generally vertically oriented B column, and a transverse roof girder. The transverse roof girder, starting from the longitudinal roof girder, curves in an arc and then runs horizontally, thus forming a corner area within the vehicle body interior that accommodates, without reducing, the head space of the passengers.

Methods and apparatus which incorporate the features described above and which are to effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

An example of an embodiment of the invention is described as follows with reference to the drawings, in which.

DESCRIPTION OF THE PREFERRED EMBODIMENTS

Figure 1:
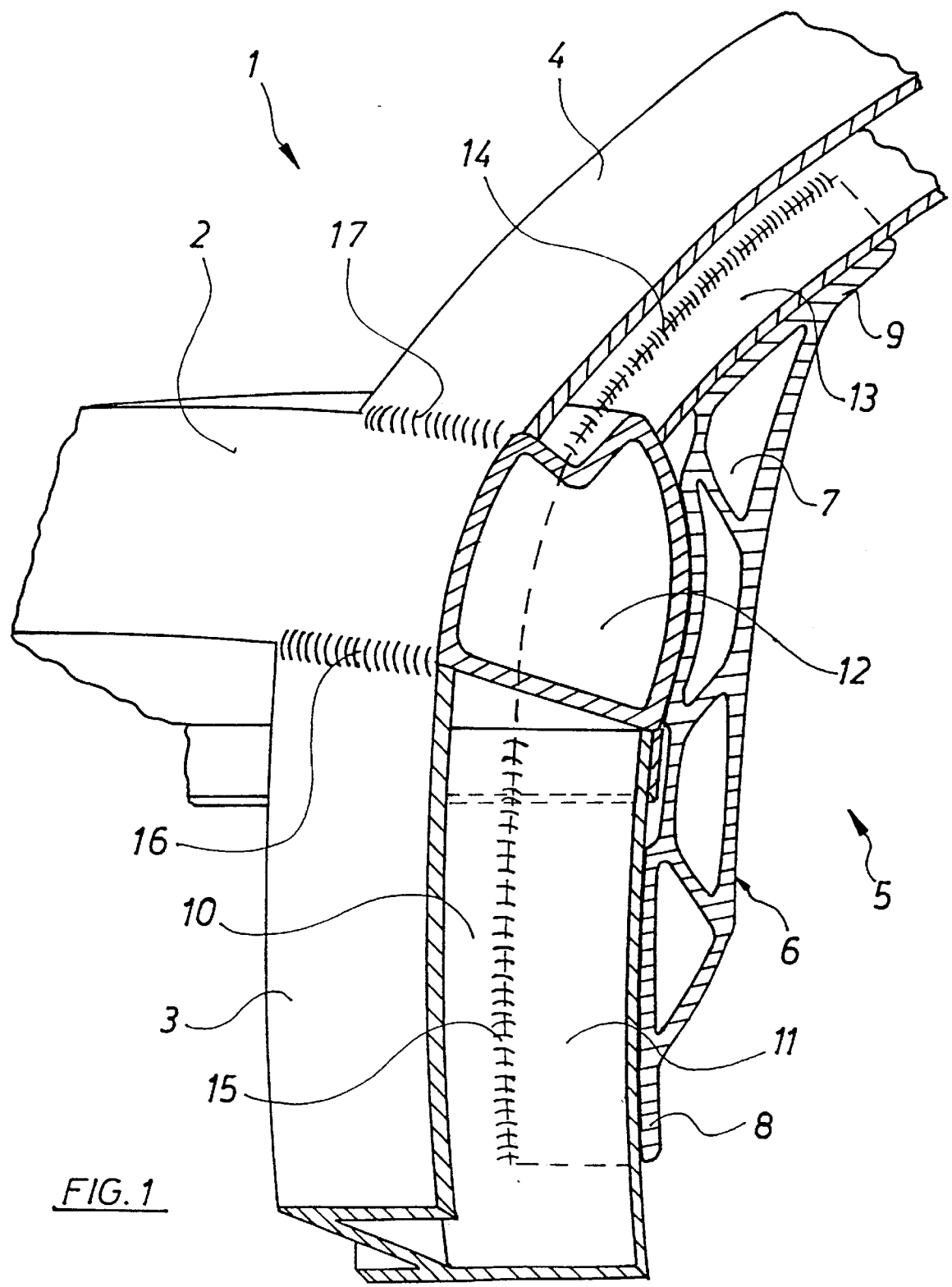
FIG. 1 is a section view through a reinforced stress bearing junction point for three hollow section frame members of a motor vehicle body in accordance with the present invention.

FIG. 1 shows a junction point 1 of a stress bearing structure of a motor-vehicle body. The junction point of structural members is formed by a longitudinal roof girder 2 running horizontally at the side of the body, a vertical B column 3, and a transverse roof girder 4. Each of the B column 3 and transverse roof girder 4 attach to opposite sides of the longitudinal roof girder 2 by a butt joint. The transverse roof girder 4, beginning at the longitudinal roof girder 2, extends at an upwards angle and curves in an arc before continuing in a horizontal run to the other side of the vehicle. This configuration defines a corner area 5 in the interior of the vehicle's body with suitable head room for the rear seated passengers.

In this corner area 5, a section of extrusion 6 having a hollow cross section is placed as a reinforcement element for the juncture point 1. The hollow section extrusion 6 is located beneath the junction point on the inside of the body. The longitudinal roof girder 2, the B column 3, and the transverse roof girder 4, as well as the extrusion section 6, are preferably formed as light metal extrusions which are joined together in a lattice structure of a motor vehicle body.

FIG. 1 shows a section through the junction point of structural members 1 transverse to the automobile. The transverse profile of the hollow section extrusion 6 is preferably made flat with four hollow section chambers 7 arranged adjacent to each other. Single wall flanges 8, 9 are formed on respective ends of the chambered region. The longitudinal axis of the hollow section extrusion 6 runs in the same direction as the longitudinal axis of the longitudinal roof girder 2. The length of the section of extrusion 6 is shorter than the width of both the B column 3 and the transverse roof girder 4. In this way, there are exposed areas 10 of the B column and of the transverse roof girder that extend beyond the edge of the section of extrusion.

The hollow section extrusion 6 is specially configured so that respective contact surfaces 11, 12, and 13 lay flat against the B column 3, the longitudinal roof girder 2, and the transverse roof girder 4 on the inside of the body. The flat lying contact areas 11, 12 and 13 provide suitable regions for strong reliable connections by welding or adhesive bonding. The hollow section extrusion 6 is joined with the B column 3 and the transverse roof girder 4 by means of longitudinal welds 14, 15. A benefit of the above described arrangement is that unfavorable transverse welds can be avoided in the region of contact between the contact surface 12 of the hollow section extrusion 12 and the longitudinal roof girder 2. In addition, the 13 column 3 and the transverse roof girder 4 are joined to the longitudinal roof girder 2 in the butt-joint area immediately above welding seams 16, 17.

When the structural member junction point 1 is subjected to lateral stresses from the outside of the body, the hollow section extrusion 6 functions as a tie rod between the B column 3 and the longitudinal roof girder 2. The result of which is that the junction point connection of structural members is freed of strain and is made stronger in comparison with a simple butt-joint connection.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a stress bearing, lattice frame support structure for a motor vehicle body constructed from hollow section beams, an improved stress absorbing joint assembly at a junction point of three hollow section beams in which a first longitudinally oriented hollow section beam is joined on respective opposing sides by second and third hollow section beams, each of the second and third hollow section beams being attached to the first hollow section beam by a butt joint, the improvement comprising:

a) a reinforcement element disposed along and secured to an underside region of the junction point and facing an interior space of the vehicle body;

b) said reinforcement element comprising a hollow section extrusion having a longitudinal axis of extrusion aligned with a longitudinal axis of the first hollow section beam and a transverse profile, said transverse profile having a width dimension greater than that of the first hollow section beam and contact surfaces extending beyond the respective opposite sides of the first hollow section beam and lying against the respective second and third hollow section beams; and c) attachment means for attaching said contact surfaces to the respective second and third hollow section beams so that a lateral stress applied to the junction point of the first, second and third hollow section beams is absorbed and stayed by said reinforcement element.

2. An improved stress bearing joint assembly according to claim 1, wherein said transverse profile of said hollow section extrusion is generally flat and includes a plural chamber region.

3. An improved stress bearing joint assembly according to claim 2, wherein said transverse profile of said hollow section extrusion further includes single wall flanges disposed along opposite sides of said plural chamber region.

4. An improved stress bearing joint assembly according to claim 1, wherein said hollow section extrusion has a longitudinal length less than a width dimension of either of the second or third hollow section beams.

5. An improved stress bearing joint assembly according to claim 1, wherein:
   a) the first, second and third hollow section beams comprise light metal extrusions; and
   b) said hollow section extrusion section comprises light metal.

6. An improved stress bearing joint assembly according to claim 1, wherein said attachment means comprises a welded joint connection.

7. An improved stress bearing joint assembly according to claim 1, wherein said attachment means comprises an adhesive bonded joint connection.

8. An improved stress bearing joint assembly according to claim 1, wherein:
   a) the first hollow section beam is a longitudinal roof girder located along a side of the vehicle body and lying in a horizontal plane;
   b) the second hollow section beam is a B column that extends vertically downward from the longitudinal roof girder;
   c) the third hollow section beam is a transverse roof girder that extends inwardly from the longitudinal roof girder, originally curving in an arc and then extending in a horizontal direction, and
   d) the junction point between the longitudinal roof girder, the B column and the transverse roof girder defining a rear corner area of the vehicle body under which the hollow section extrusion is located.

9. An improved stress bearing joint assembly according to claim 5, wherein said attachment means comprises a welded joint connection.

10. An improved stress bearing joint assembly according to claim 5, wherein said attachment means comprises an adhesive bonded joint connection.

11. An improved stress bearing joint assembly according to claim 4, wherein said hollow section extrusion has a longitudinal length less than a width dimension of either of the second or third hollow section beams.

12. An improved stress bearing joint assembly according to claim 11, wherein:
   a) the first, second and third hollow section beams comprise light metal extrusions; and
   b) said hollow section extrusion section comprises light metal.

13. A joint assembly for a stress bearing lattice frame support structure of a motor vehicle body constructed from hollow section beams, the joint assembly comprising:
   a) a first longitudinally oriented hollow section beam having opposing first and second sides;
   b) a second generally vertical hollow section beam joined by a butt joint connection to said first side of said first hollow section bean;
   c) a third hollow section beam joined by a butt joint connection to said second side of said first hollow section bean and opposite said second hollow section beam;
   d) said first, second and third hollow section beams defining a junction point;
   e) a reinforcement element disposed along and secured to an underside region of said junction point;
   f) said reinforcement element comprising a hollow section extrusion having a longitudinal axis of extrusion aligned with a longitudinal axis of said first hollow section beam and a transverse profile, said transverse profile having a width dimension greater than that of said first hollow section beam and contact surfaces extending beyond the respective opposite sides of said first hollow section beam and lying against said respective second and third hollow section beams; and
   e) attachment means for attaching said contact surfaces to the respective second and third hollow section beams so that a lateral stress applied to the junction point of said first, second and third hollow section beams is absorbed and stayed by said reinforcement element acting as a tie rod.

14. The joint assembly according to claim 13, wherein said transverse profile of said hollow section extrusion is generally flat and includes a plural chamber region.

15. The joint assembly according to claim 13, wherein said transverse profile of said hollow section extrusion further includes single wall flanges disposed along opposite sides of said plural chamber region.

16. The joint assembly according to claim 13, wherein said hollow section extrusion has a longitudinal length less than a width dimension of either of said second or third hollow section beams.

17. The joint assembly according to claim 13, wherein:
   a) said first, second and third hollow section beams comprise light metal extrusions; and
   b) said hollow section extrusion section comprises light metal.

18. The joint assembly according to claim 13, wherein said attachment means comprises a welded joint connection.

19. The joint assembly according to claim 13, wherein said attachment means comprises an adhesive bonded joint connection.

20. The joint assembly according to claim 13, wherein:
   a) said first hollow section beam is a longitudinal roof girder located along a side of the vehicle body and lying in a horizontal plane;
   b) said second hollow section beam is a B column that extends vertically downward from said longitudinal roof girder; and
   c) said third hollow section beam is a transverse roof girder that extends inwardly from said longitudinal roof girder, originally curving in an arc and then extending in a horizontal direction.

21. The joint assembly according to claim 17, wherein said attachment means; comprises a welded joint connection.

22. The joint assembly according to claim 17, wherein said attachment means comprises an adhesive bonded joint connection.

23. The joint assembly according to claim 16, wherein said hollow section extrusion has a longitudinal length less than a width dimension of either of said second or third hollow section beams.

24. The joint assembly according to claim 23, wherein:
   a) said first, second and third hollow section beams comprise light metal extrusions; and
   b) said hollow section extrusion section comprises light metal.

* * * * *